UNITED STATES PATENT OFFICE.

MAX MOELLER, OF BERLIN, GERMANY, ASSIGNOR TO THE ACTIEN-GESELL-SCHAFT FÜR ANILIN FABRIKATION, OF SAME PLACE.

BLUE DYE.

SPECIFICATION forming part of Letters Patent No. 539,699, dated May 21, 1895.

Application filed June 8, 1893. Serial No. 476,962. (Specimens.)

*To all whom it may concern:*

Be it known that I, MAX MOELLER, of Berlin, in the Kingdom of Prussia, German Empire, have invented new and useful Improvements in the Production of a Blue Dye; and I do hereby declare that the following is a full, clear, and exact description of the invention, which will enable others skilled in the art to which it appertains to make and use the same.

The invention relates to the production of new azo-dyes containing as component the 1.8 amidonaphtoldisulfo acid—described in my application, Serial No. 466,691, dated March 18, 1893—which is prepared by transforming the alpha naphtylamindisulfo acid, mentioned in the German Patent No. 40,571 into alpha naphtylaminitrisulfo acid and converting the latter into the amidonaphtoldisulfo acid by melting with caustic alkalies. This new 1.8 amidonaphtoldisulfo acid which according to its formation possesses the following constitution

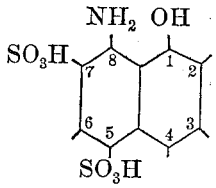

I have found to be extraordinarily fit for the production of valuable blue dyestuffs derived from the tetrazo compounds of paradiamins.

The following example will show the manner in which I may practically carry out my invention: 18.4 kilograms benzidin are converted into tetrazodiphenyl salt in the well known manner and the solution of the latter is poured into a solution of seventy-three kilograms 1.8 amidonaphtoldisulfonate of soda, kept alkaline by the addition of carbonate of soda. A blue black precipitate is formed immediately, which afterward dissolves for the greatest part with blue color. After standing for about twelve hours under repeatedly stirring, the mixture is gently heated and the coloring matter is precipitated by means of common salt, filtrated, pressed and dried. It forms an amorphous dark brown powder of metallic luster, which dissolves easily in water with greenish blue color, that turns into violet blue by the addition of caustic soda lye. From the aqueous solution of the dyestuff the free color-acid is precipitated by adding concentrated mineral acid, while acetic acid produces no precipitate.

The dyestuff is nearly insoluble in alcohol. In concentrated sulfuric acid it dissolves with indigo blue color. On diluting with water this solution turns at first into violet blue and then the color-acid separates in the shape of dark blue flakes.

The dyestuffs dye unmordanted cotton in an alkaline or neutral bath containing common salt or Glauber's salt a pure blue. It may also be fixed on wool in a slightly acidulated dyebath.

The following alterations may be made in the above example without materially changing the character of the product obtained: I may combine the tetrazo derivative at first with only one molecule of the 1.8—amidonaphtoldisulfo acid in order to form an intermediate product and react afterward with the latter upon phenoles, amines or their sulfo or carbo acids. For instance by combining the intermediate product resulting from 18.4 kilograms benzidin and 36.5 kilograms 1.8 amidonaphtoldisulfonate of soda with 24.4 kilograms alpha naphtol-alpha-monosulfonate of soda a dyestuff is produced which dyes unmordanted cotton also a pure blue shade.

Having now described my invention, what I claim is—

1. The blue dyestuff derived from 1.8 amidonaphtoldisulfo acid and the tetrazo compound of benzidin, said dyestuff being easily soluble in water, nearly insoluble in alcohol, dissolving with indigo blue color in strong sulfuric acid, which solution turns at first violet blue on diluting with water and from which then the free color-acid separates in the form of a dark blue precipitate—substantially as set forth.

2. The process for the production of blue coloring-matters by acting with one molecular proportion of a tetrazo compound of a paradiamin on two molecular proportions of the sodium salt of amidonaphtoldisulfo acid, $(NH_2:SO_3:H:SO_3H:OH = 1:2:4:8)$ in an alkaline solution.

In testimony whereof I hereunto set my hand and affix my seal, in the presence of two witnesses, this 19th day of May, A. D. 1893.

MAX MOELLER. [L. S.]

Witnesses:
 REINHOLD SCHÖENBRODT,
 GUSTAV LUCHT.